June 16, 1959 J. W. WRIGHT 2,890,548
METHOD AND APPARATUS FOR CONTROLLING CONVECTION
CURRENTS OF MOLTEN GLASS
Filed Sept. 27, 1956 2 Sheets-Sheet 1

INVENTOR.
Joseph W. Wright
BY J. R. Nelson
&
Leonard D. Soubier

ATTORNEYS

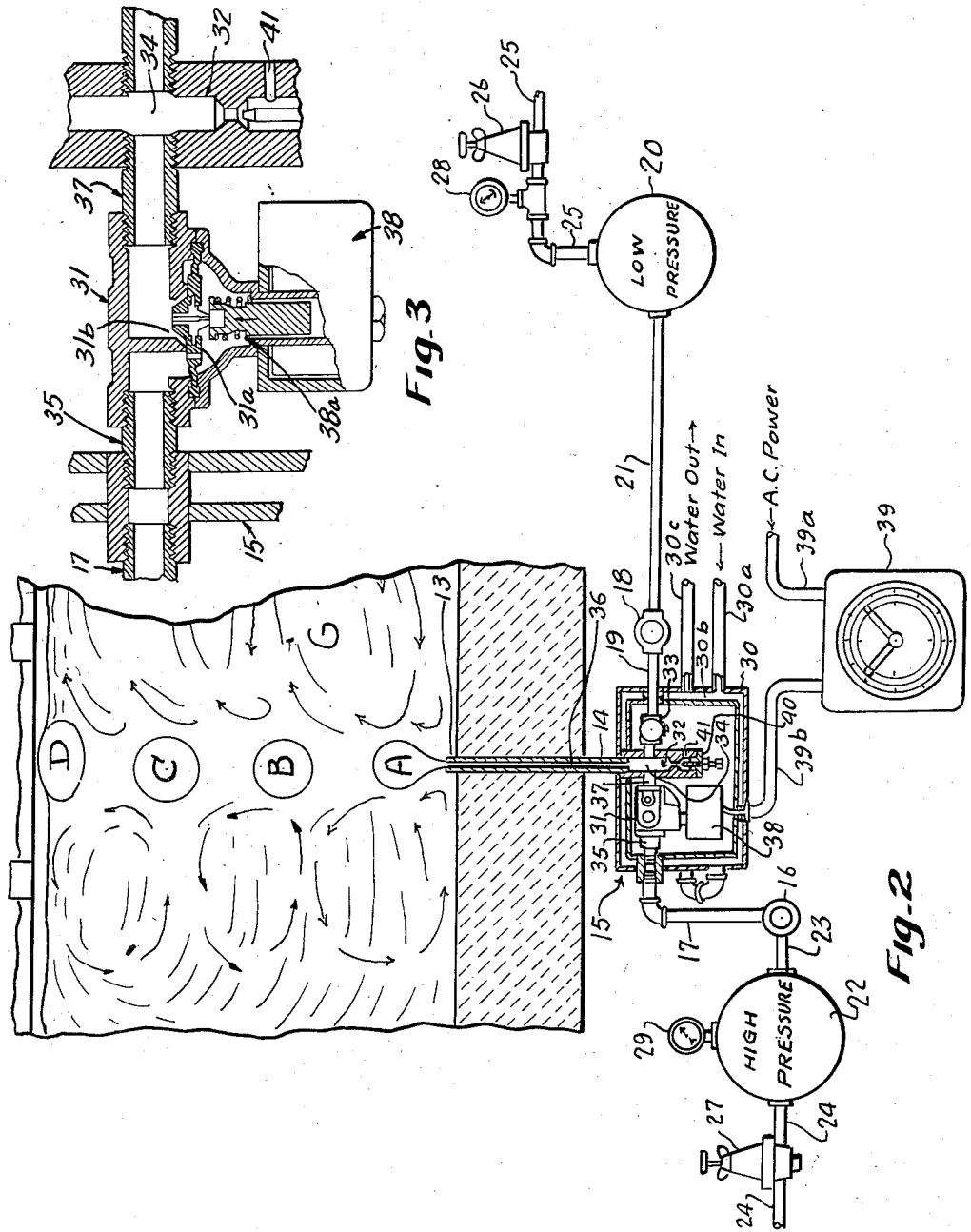

United States Patent Office 2,890,548
Patented June 16, 1959

2,890,548

METHOD AND APPARATUS FOR CONTROLLING CONVECTION CURRENTS OF MOLTEN GLASS

Joseph W. Wright, Toledo, Ohio, assignor to Owens-Illinois Glass Company, a corporation of Ohio Application September 27, 1956, Serial No. 612,532

17 Claims. (Cl. 49—54)

This invention relates to new and improved method and apparatus for controlling convection currents in a body of molten glass, and more particularly to controlling such currents under the influence of gaseous bubbles introduced into said body through an arrangement of bubbling nozzles for producing a controlled circulation of the glass of said body.

In a body of glass contained in a conventional continuous furnace in which the operations of melting and refining are carried on continuously, a temperature gradient exists between the surface of the glass where heat is applied and the glass layer along the furnace floor. For proper melting and refining, it is desirable to maintain the temperatures between the surface and bottom layers of the glass as nearly uniform as possible, and deliver glass for manufacture of commercial ware at the desired working temperature. This is accomplished by controlled convection currents set up in the furnace to continually mix the surface and bottom layers of glass and reduce the temperature gradient as much as possible. To accomplish this requires an increased amount of circulation within the glass body. In so doing, the efficiency of the melter is increased, resulting in the production of glass having the necessary uniform homogenous consistency for subsequent use in the manufacture of commercial ware and increased "pull" or output of the furnace per unit of time.

The use of continuous gas bubblers for increasing these convection currents in the glass contained in glass melting furnaces is well known in glass melting practice. This has been practiced, heretofore, by inserting a series of bubbling tubes through the floor of the melter and passing a continuous flow of gas under pressure through these tubes causing a continuous stream of bubbles to rise vertically in the body of molten glass. This practice is disclosed in my U.S. Patent No. 2,387,222, "Method of Refining Glass."

By introducing a constant pressure flow of gas into the viscous glass body through a series of bubbling tubes, the gas forms bubbles of a given size which, when they break off from the bubbling tube, rise vertically in the glass body at a rate proportional to the size of the bubble formed. This upward movement of bubbles causes the viscous glass which envelops them to move upwardly in the glass body with the bubbles, thereby causing an increased circulation of molten glass in their path. The continuous bubbling of gas in this manner produces a stream of comparatively small bubbles, their size depending primarily upon the viscosity of glass, the diameter of the tube and the pressure of the gas utilized.

Although the continuous flow of gas may be regulated to increase or decrease the number of bubbles formed per unit of time, the size of the bubble is substantially constant for a given viscosity of glass and given quantity of gas flow through the bubbling tube.

The rate of movement of the glass will vary proportionally to the size of the bubble. The rate of ascension to the point of degassing (bursting) of gas bubbles in a glass body is proportional to the surface area presented by the bubbles in contact with the glass. Since the surface area is directly proportional to the square of the radius while the ascension time is inversely proportional thereto, it follows that the rate of movement of a gas bubble towards its degassing action must be dependent on its radius. This, however, holds true only under given conditions of glass temperature, the initial size of the bubble, and the expandability of the gas utilized. Variation in these later mentioned variable factors will also affect the degassing rate of the bubble. Generally the smaller the size of the bubble, the more closely the bubbler tubes must be spaced in any selected zone of the melter, and the more bubblers that will be needed to produce sufficient increased circulation of glass in that zone.

Accordingly, it is an object of this invention to provide a method of controlling convection currents in a body of molten glass by producing bubbles of increased size for introduction along the bottom of the glass body.

Another object of this invention is to provide a method and apparatus for controlling these convection currents by controlling the size of the bubbles utilized.

A further object of this invention is to provide the above-mentioned method and apparatus for bubbling gases into a glass body in which the molten glass above the bubbling nozzle opening is prevented from entering said opening whenever bubbling is interrupted or stopped.

The specific nature of this invention, as well as other objects and advantages thereof, will become apparent to those skilled in the art from the following detailed description, taken in conjunction with the annexed sheet of drawings on which, by way of preferred example only, is illustrated the preferred embodiment of this invention.

In the drawings:

Fig. 2 is a schematic sectional view, showing the bubbler unit of this invention inserted in its operative position in the bottom of a melter, and producing enlarged bubbles in the molten glass therein contained by the method of this invention hereinafter described.

Fig. 3 is a sectional elevational view taken longitudinally through the solenoid-valve apparatus in the high pressure line of the bubbler unit of the invention.

Figure 1:
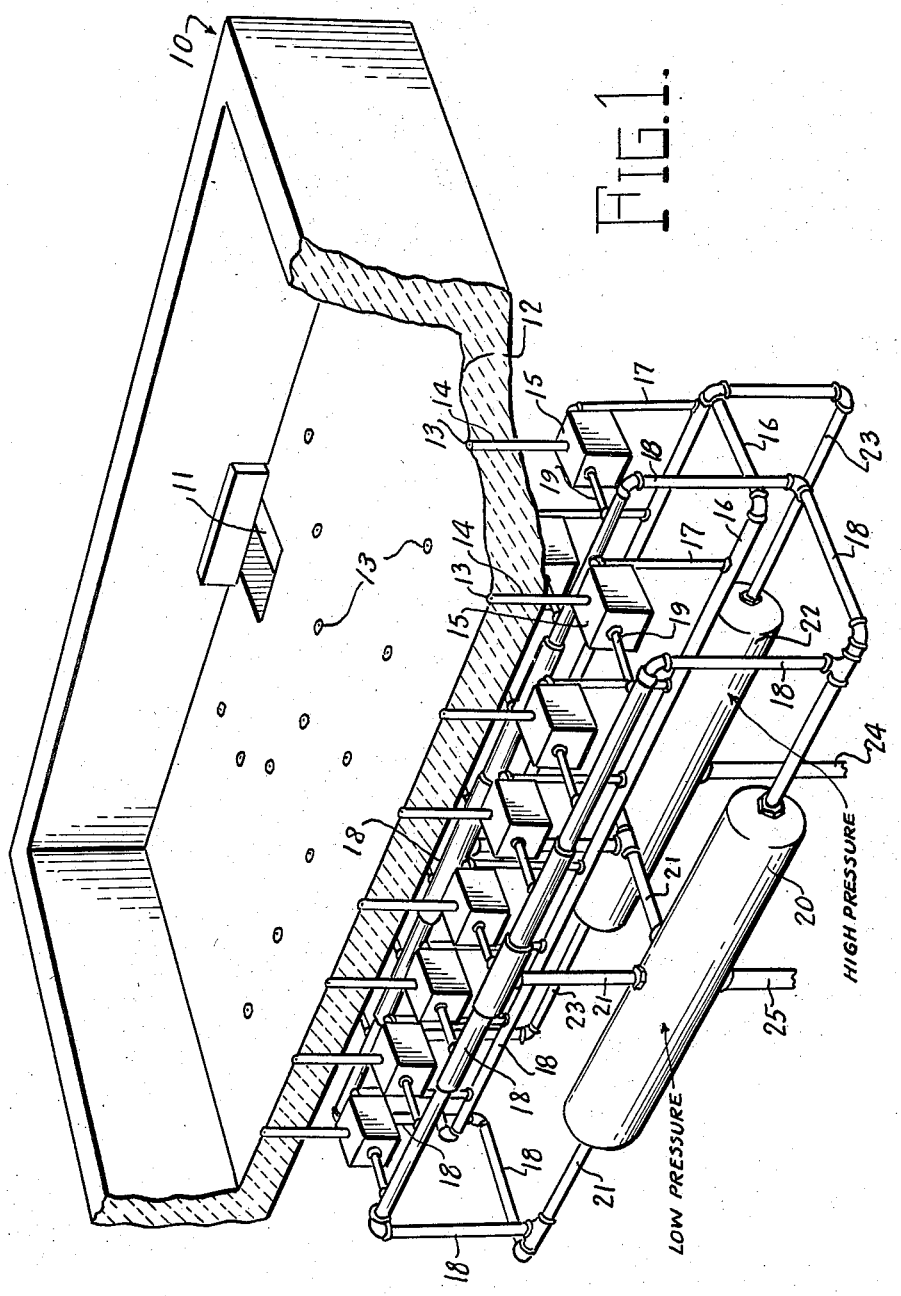
Fig. 1 is a perspective view, partly in section, showing a glass melter equipped with a series of bubbling units of this invention arranged about the bottom of the melter, and includes the piping arrangement for connecting a series of these bubbler units to high and low pressure gas sources.

The description that follows hereinafter and the above described drawings, by way of a specific illustration, describe this invention as applied to a glass melter. Let it be understood, however, that this invention is readily applicable to any metal carrying chamber adapted to melt, refine, or feed a molten metal.

Referring to Fig. 1, reference numeral 10 identifies a conventional glass melter provided with a throat outlet 11 leading to a refiner (not shown). Interspersed about the floor 12 of melter 10 are a series of bubbler nozzles 13 opening into a molten glass body adapted to be contained in melter 10. Extending downwardly from bubbling nozzles 13 are bubbler tubes 14 constructed of a heat resistant material, preferably of porcelain or platinum, connected into bubbler control units 15, more particularly described hereinafter. Bubbler control units 15 are each connected to high pressure manifolds 16 by conduits 17 and similarly connected to low pressure manifolds 18 by conduits 19. Low pressure manifolds 18 are connected to low pressure tank 20 by pipes 21. High pressure tank 22 is connected to high pressure manifolds 16 by pipes 23. High pressure tank 22 is connected to a source of high pressure gas (not shown) by pipe 24. Similarly, low pressure tank 20 is connected to a source of low pressure gas (not shown) by pipe 25. Both the low and high pressure sources of gas are regulated by pressure regulators 26 and 27 (Fig. 2) inserted, respectively, in pipes 25 and 24. Pressures maintained within tanks 20 and 22 are indicated by their respective pressure gauges 28 and 29 (Fig. 2).

Referring now to Figs. 2 and 3, the novel apparatus and method of this invention will be described.

Bubbler unit 15 comprises a housing 30 enclosing a solenoid operated valve 31, bubbler tube assembly 32, and check valve 33. Housing 30 is liquid cooled by circulating a liquid, such as water, through an interior coolant chamber 30b. The liquid is supplied by circulating pump (not shown) which circulates the liquid through inlet pipe 30a, coolant chamber 30b and back to a radiator (not shown) through outlet pipe 30c. Due to the high operating temperatures near the floor of melter 10, this means is provided for removing radiated heat received by bubble control unit 15 from melter 10. Conduit 17 carrying the high pressure gas passes through the side of housing 30 and is connected to the in-take side 35 of valve 31. The outlet side of valve 31 is connected to a chamber 34 in bubbler tube assembly 32 by port 37. Port 37 communicates with the central core 36 of bubbler tube 14 through chamber 34.

The lower pressure gas carried in conduit 19 is connected to chamber 34 for flow into central core 36 of bubbler tube 14. The pressure in tank 20 and in connecting conduit 19 is set by regulator 26, so that the low pressure gas in chamber 34 and central core 36 will just balance the pressure head of the molten glass G bearing on the open end of bubbler nozzle 13. By this arrangement, the molten glass will not enter bubbler nozzle 13, yet the pressure of the gas from tank 20 is not sufficient to form bubbles at said nozzle. If glass is allowed to enter the bubbler tube 14 at nozzle 13 without almost immediately forcing it back out of the tube, the lowered temperature within said tube will solidify the glass and seal off the bubbler nozzle 13. This has presented heretofore a serious problem for the use of bubblers, because if bubbling is temporarily interrupted at any one of the bubbler tubes, the resultant solidifying glass will seal it off almost immediately to prevent its continued use. To put the sealed off bubbler back into operation requires either of two repair operations:

(1) Injecting an auxiliary source of gas under very high pressure into the tube in an attempt to loosen the solidified piece of glass therein and force it back into the melter.

(2) By removing the tube from the floor of the melter and substituting a replacement therefor.

Both of these repair operations are very inconvenient and costly. Thus, the present invention eliminates this problem by utilizing the low pressure gas to balance the head of glass and hold it back from entering the bubbler nozzle 13.

Check valve 33 is connected into low pressure conduit 19, and permits flow of low pressure gas from manifold 18 to chamber 34, but blocks the flow of gas from chamber 34 back to manifold 18.

Valve 31 is spring set by a spring 38a to hold the valve diaphragm 31a closed to normally block the flow of high pressure gas in conduit 17 to chamber 34 in bubbler tube assembly 32. Valve 31 is actuated by a conventional solenoid actuator 38 to shift the valve diaphragm 31a downwardly and connect the high pressure gas in conduit 17 to chamber 34. Solenoid actuator 38 is electrically connected in series to an electric power source (not shown) through an electric timer control 39 to time the actuating cycles of solenoid 38. Timer control 39 is set to close the circuits 39a and 39b intermittently for measured periods of time during which solenoid actuator 38 is energized to open valve 31 and connect the high pressure gas in conduit 17 to bubbler tube 14. At the end of the timed period the circuit is broken, solenoid 38 is deenergized and valve 31 is spring closed by holding valve diaphragm 31a across the internal passage 31b of the valve to block the flow of high pressure gas to bubbler tube 14. In this manner, measured volumes of gas under high pressure are fed to bubbler nozzle 13 and exploded thereby into the molten glass.

The lower portion of bubbler tube assembly 32 is provided with an adjustable needle valve 40 projecting into the lower portion of chamber 34. The lower end of chamber 34 has a bleeder passage 41 connected to exhaust to the atmosphere. Chamber 34, as previously described, is adapted to receive a constant supply of low pressure gas from conduit 19 plus the intermittent charges of high pressure gas from port 37 of valve 31. Needle valve 40 and bleeder passage 41 serve two functions, namely; (1) Changes of pressure which tend to overbalance the glass pressure head caused by a variation of pressure head of glass over bubbler nozzle 13 are balanced by adjusting needle valve 40 to exhaust any excess amount of low pressure through bleeder passage 41. This serves as a vernier type of adjustment of the lower pressure gas flow to prevent it from forming bubbles at bubbler nozzle 13. (2) After the main bubble A (Fig. 2) has formed and breaks away from bubbler nozzle 13, any remaining volume of high pressure gas that did not get into the main bubble A may be exhausted to the atmosphere through bleeder passage 41 rather than accumulate at bubbler nozzle 13 to form a small trailer bubble prior to the injection of the next volume of high pressure gas by valve 31 to form the next main bubble as A. This latter-mentioned function will not always be necessary if valve 31 is set properly to meter the required volume of gas for for forming only a main bubble A, and if regulator 27 in the high pressure circuit maintains a desired constant pressure. The needle valve 40 and bleeder passage 41 do, however, provide a means to correct for slight variations occurring in the volume of high pressure gas injected into bubble tube 14 by valve 31.

In practicing the method of this invention, a low pressure gas is continuously passed from tank 20 through pipe 21, manifold 18, conduit 19 into chamber 34 of bubbler tube assembly 32. The pressure setting of regulator 26 is such that the pressure maintained in tank 20 will balance the pressure head exerted by the molten glass G on bubbler nozzle 15. High pressure gas is supplied from tank 22 to the manifold 18 and conduit 17 into the inlet side of valve 31. Valve 31 is normally maintained closed by a spring 38a holding valve diaphragm 31a in its closed position or by other suitable valve closing means to block the flow of gas into chamber 34 of bubbler tube assembly 32. Timer control 39 is set to actuate the solenoid 38 at timed intervals to open valve 31 and permit high pressure gas to flow into chamber 34, central core 36 and bubbler nozzle 13. After a predetermined time lapse, timer control 39 deenergizes solenoid 38 and valve 31 again closes to block off the flow of gas into chamber 34.

Thus, by rapidly intermittently opening and closing valve 31 measured volumes of high pressure gas are injected into the bubbler tube 14 and exploded at bubbler nozzle 13 to form enlarged gas bubbles A at the bottom level of the molten glass contained in melter 10. This volume of gas is measured as a function of the pressure in conduit 17 and the time lapsed during which timer control 39 energizes solenoid 38 to maintain valve 31 open for flow of high pressure gas into chamber 34. It has been found that the desirable time settings of timer control 39 for maintaining the solenoid energized and opening valve 31 is within the range of from $\frac{1}{10}$ to $\frac{2}{10}$ second.

Thus, by rapidly injecting of a measured volume of high pressured gas into bubbler tube 14 and exploding it through bubbler nozzle 13, the dependent viscosity of the molten glass G on the gas tends to form one enlarged bubble for each measured volume of gas exploded, compared to the series of smaller bubbles formed by continuously flowing gas under pressure through the same nozzle.

As the bubble at A severs from bubbler nozzle 13, it conforms to a spherical shape and rises in the viscous molten glass, as at B, carrying adjacent portions of the glass with it towards the surface. As the bubble rises, the differential pressure change and heating effect of the molten glass on the gas causes the bubble to expand, such as shown at C. When the bubble reaches the surface of the glass, indicated as D, it continues to rise and expand, and the enveloping glass, due to surface tension, permeates the surface to form an elliptically shaped bubble, such as shown at D. The hot gas within the bubble then expands until the bubble bursts and the gas contained within the bubble is released into the upper portion of melter 10.

By varying the time measurement and pressure for controlling the volume of gas injected into bubbler tube 14, the size of bubble formed on bubbler nozzle 13 at A is controllable.

By arranging the bubbles in a pattern across the width of melter 10, the resulting rise of gaseous bubbles tends to produce a rising curtain of molten glass which is drawn upwardly with the ascending gas bubbles. As a result, the glass which ordinarily travels along or adjacent to the floor 12 of melter 10 is moved upwardly towards the surface where the higher melter temperatures exist. By this controlled circulation of the glass in the melter, the differential in temperatures between the surface layer of glass and the floor layer is reduced, giving a more efficient melting cycle resulting in increased furnace output and improved homogeneity of the glass produced.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. The method of controlling convection currents in a body of molten glass in a glass furnace by injecting gas through a bubbling nozzle into the lower level of the molten glass body, which comprises balancing the pressure head of glass over said nozzle by maintaining therein a low-pressure gas, and suddenly injecting a predetermined volume of high-pressure gas from said nozzle, thereby forming an enlarged gaseous bubble in said lower level of said body of molten glass.

2. The method of controlling convection currents in a body of molten glass in a glass furnace by injecting gas through a plurality of bubbling nozzles into the lower level of the body of molten glass, which comprises balancing the pressure head of glass over each said nozzle by maintaining therein a low-pressure gas, and rapidly introducing a predetermined volume of high pressure gas from each of said nozzles at intervals of time, thereby forming a plurality of enlarged gaseous bubbles in said lower level of said body of molten glass.

3. The method of controlling convection currents in a body of molten glass in a glass furnace by injecting gas through a plurality of bubbling nozzles into the lower level of the body of molten glass, which comprises balancing the pressure head of glass over each said nozzle by maintaining therein a low-pressure gas, and periodically injecting suddenly a predetermined volume of high-pressure gas from each of said nozzles, thereby forming a plurality of enlarged gaseous bubbles in said lower level of said body causing an upward movement of a curtain-like portion of glass and producing an upward movement of said enlarged bubbles and an upward drag therewith of the enveloping glass.

4. The method of controlling convection currents in a body of molten glass in a glass furnace by injecting gas through a bubbling nozzle into the lower level of the molten glass body, which comprises balancing the pressure head of glass over said nozzle by maintaining therein a low-pressure gas, and periodically injecting a predetermined volume of high-pressure gas into said nozzle by rapidly opening a valve to permit high-pressure gas to flow to said nozzle and rapidly closing said valve after a predetermined lapse of time.

5. The method of controlling the lower level temperature in a body of molten glass in a glass furnace which comprises periodically releasing a predetermined volume of gas under pressure, thereby exploding said released volume of gas into the lower level of said body of glass through a nozzle opening, to provide an active gaseous movement of glass at the bottom of the molten glass body, and balancing the pressure head of glass over said nozzle opening with a corresponding pressure of gas therein between said periodic releases of gas.

6. Apparatus for controlling convection currents in a body of molten glass contained in a chamber comprising a bubbling nozzle inserted into the bottom of said chamber and in contact with the body of molten glass, a first pressure source of gas, first gas carrying means connected between said first pressure source and said nozzle for conducting the flow of gas thereto, a means for regulating the pressure of said first pressure source of gas to balance said first pressure with the pressure head of glass over said nozzle, a second pressure source of gas in excess of the pressure of said first pressure source, second gas carrying means connected between said second pressure source and said nozzle for conducting the flow of gas thereto, a valve inserted in said second carrying means between said second pressure source and said nozzle, said valve being normally set to block the connection between said second pressure source and said nozzle, and adapted to shift to connect said second pressure source and said nozzle, and valve actuating means operatively connected to said valve for sequentially shifting it to connect said second pressure source and said nozzle for a predetermined period of time and then permit said valve to return to its said normal setting, whereby a metered volume of higher pressure gas is forced through the bubbling nozzle to form an enlarged gaseous bubble in the body of molten glass.

7. Apparatus according to claim 6 wherein the valve actuating means comprises an electric solenoid operatively connected thereto for shifting said valve to connect the second pressure source and the bubbling nozzle, said solenoid being periodically energized responsive to a timer control.

8. Apparatus according to claim 7, wherein the valve is normally spring set to block the connection between the second pressure source and the bubbling nozzle.

9. Apparatus according to claim 6, and having a check valve in the first gas carrying means to prevent gas flow from the bubbling nozzle to the first pressure source.

10. Apparatus according to claim 6, having a bleeder passage connected to the bubbling nozzle and provided with a needle valve in said passage for bleeding gas from said nozzle when the pressure therein exceeds the pressure necessary for balancing the pressure head of glass over the nozzle.

11. Apparatus for bubbling gases into a body of molten glass contained in a chamber to control the convection currents therein comprising a bubbling nozzle inserted into the bottom of said chamber in contact with said body of glass, a first pressure source of gas connected to said nozzle, the pressure of said first source adapted to balance the pressure head of glass over said nozzle, a second pressure source of gas, the pressure of said second source exceeding the pressure of said first source, a valve operatively connected to said second source and to said nozzle, said valve being adapted to shift alternatively to block the flow of gas to said nozzle, and to connect the flow of high pressure gas to said nozzle, and means for periodically shifting alternately said valve from one of its said settings to the other at predetermined time intervals, whereby a measured volume of high pressure gas is periodically injected into the body of glass in the form of enlarged bubbles therein.

12. Apparatus according to claim 11, wherein the means for shifting the valve comprises a spring normally holding said valve set to block flow to the bubbling nozzle, and a timer-controlled electric solenoid operatively connected to said valve and energized during predetermined timed intervals to shift said valve to connect the flow of high-pressure gas to said nozzle whenever said solenoid is energized.

13. Apparatus according to claim 12, wherein a bleeder passage is connected to the bubbling nozzle for bleeding pressures of gas in said nozzle in excess of the pressure necessary to balance the pressure head of glass over said nozzle, thereby equalizing the pressures between the gas in said nozzle and the pressure head of glass over said nozzle whenever the valve is set to block the flow of gas from the second pressure source to said nozzle.

14. Apparatus according to claim 13, wherein a check valve is connected between the first pressure source and the bubbling nozzle to prevent the flow of gas back to said first pressure source.

15. The method of controlling the size and number of gaseous bubbles discharged from the orifice of bubbler apparatus adapted for emitting gaseous bubbles in a body of molten glass in a glass furnace below the surface of said body comprising applying timed pulses of high pressured gas to the bubbling orifice, and maintaining a gas pressure at said orifice between high pressure pulses sufficient to balance the hydrostatic head of glass above the orifice.

16. The method of controlling the size and number of gaseous bubbles produced by bubbler installations in a glass furnace, said bubbles being discharged at the bubbler orifice located below the glass surface which comprises injecting timed pulses of high pressure gas at the bubbler orifice, and, between these high pressure pulses, maintaining a gas pressure at the said orifice sufficient to balance the hydrostatic head of glass over the orifice.

17. The method of controlling convection currents in a body of molten glass in a glass furnace by injecting gas through a bubbling nozzle into the lower level of the molten glass body which comprises balancing the pressure head of glass over said nozzle by maintaining therein a low-pressure gas, and intermittently suddenly injecting predetermined volumes of high-pressure gas from said nozzle, thereby successively forming enlarged gaseous bubbles in said lower level of said body of molten glass.

References Cited in the file of this patent

UNITED STATES PATENTS

| | | |
|---|---|---|
| 2,263,549 | Peyches | Nov. 18, 1941 |
| 2,387,222 | Wright | Oct. 16, 1945 |
| 2,634,555 | Henry et al. | Apr. 14, 1953 |